United States Patent
Bolen et al.

(10) Patent No.: US 10,055,160 B2
(45) Date of Patent: Aug. 21, 2018

(54) SYSTEMS AND METHODS FOR BIOS EMULATION OF PCIE DEVICE

(71) Applicant: Dell Products L.P., Round Rock, TX (US)

(72) Inventors: Austin P. Bolen, Austin, TX (US); Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/095,980

(22) Filed: Apr. 11, 2016

(65) Prior Publication Data

US 2017/0293448 A1 Oct. 12, 2017

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |
| G06F 13/42 | (2006.01) |
| G06F 9/4401 | (2018.01) |

(52) U.S. Cl.
CPC ............ *G06F 3/0632* (2013.01); *G06F 3/061* (2013.01); *G06F 3/0604* (2013.01); *G06F 3/0629* (2013.01); *G06F 3/0664* (2013.01); *G06F 3/0689* (2013.01); *G06F 13/4282* (2013.01); *G06F 9/4406* (2013.01); *G06F 9/4411* (2013.01); *G06F 9/4413* (2013.01); *G06F 9/4415* (2013.01); *G06F 2213/0026* (2013.01)

(58) Field of Classification Search
CPC .... G06F 3/0632; G06F 3/0604; G06F 3/0607; G06F 3/061; G06F 3/0617; G06F 3/0664; G06F 3/0689; G06F 13/4282; G06F 9/445; G06F 9/4401; G06F 9/4411; G06F 9/4413; G06F 9/4415; G06F 9/4406; G06F 9/4408; G06F 9/4405; G06F 12/0656; G06F 3/0629; G06F 2213/0026; G06F 2213/0042; G06F 13/10; G06F 13/385; G06F 13/4081; G06F 13/102
USPC ........ 711/114, 103, 115; 710/8, 10, 13, 302, 710/303, 18, 19; 713/1, 2
See application file for complete search history.

(56) References Cited

U.S. PATENT DOCUMENTS

| | | | |
|---|---|---|---|
| 8,959,253 B2 * | 2/2015 | Nath | G06F 9/455 710/10 |
| 2006/0241930 A1 | 10/2006 | Oshins et al. | |
| 2008/0065875 A1 * | 3/2008 | Thompson | G06F 3/0607 713/2 |
| 2009/0019208 A1 * | 1/2009 | Sanvido | G06F 9/45558 711/2 |

(Continued)

Primary Examiner — Shane Woolwine
(74) Attorney, Agent, or Firm — Jackson Walker L.L.P.

(57) ABSTRACT

In accordance with embodiments of the present disclosure, an information handling system may include a processor and a basic input/output system comprising a program of instructions executable by the processor and configured to cause the processor to initialize one or more information handling resources of the information handling system. The basic input/output system may be further configured to, prior to boot of an operating system of the information handling system, initialize a virtual device controller emulating a hardware controller for controlling peripheral devices communicatively coupled to the processor, and cause the virtual device controller to interact with a driver executing on the operating system to control the peripheral devices.

12 Claims, 2 Drawing Sheets

(56) References Cited

U.S. PATENT DOCUMENTS

| | | | |
|---|---|---|---|
| 2009/0319660 A1* | 12/2009 | Cavalaris | G06F 13/385 |
| | | | 709/225 |
| 2013/0055249 A1* | 2/2013 | Vaghani | G06F 3/0617 |
| | | | 718/1 |
| 2015/0026379 A1 | 1/2015 | Yang et al. | |
| 2016/0378353 A1* | 12/2016 | Schmisseur | G06F 3/0608 |
| | | | 711/114 |

* cited by examiner

SYSTEMS AND METHODS FOR BIOS EMULATION OF PCIE DEVICE

TECHNICAL FIELD

The present disclosure relates in general to information handling systems, and more particularly to methods and systems for BIOS emulation of peripheral devices, including Peripheral Component Interconnect Express (PCIe) devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use peripheral devices including Peripheral Component Interconnect (PCI) and PCI Express (PCIe) devices for storage and/or other functionality. For example, Non-Volatile Memory Express (NVMe) storage devices may often be implemented as PCIe devices.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

In traditional approaches, a storage array is typically managed by a hardware storage controller that may interface with a RAID driver executing on top of an operating system of an information handling system. Because individual storage resources are controlled by a standalone storage controller, as storage resources are added and removed, the RAID may be maintained.

However, in NVMe devices, the PCIe controller is not fixed in an information handling system chipset as are traditional storage controllers. Instead, PCIe controllers exist on the NVMe devices themselves. Thus, when an NVMe storage resource is removed from an information handling system, the PCIe controller is removed and no longer visible to the operating system. Such removal may cause the operating system to unload its software RAID driver and, as a result, after a primary NVMe storage resource is removed, no more NVMe drives can be hot added and the RAID volume cannot be rebuilt.

SUMMARY

In accordance with the teachings of the present disclosure, the disadvantages and problems associated with existing approaches to implementing storage arrays comprising PCIe devices may be reduced or eliminated.

In accordance with embodiments of the present disclosure, an information handling system may include a processor and a basic input/output system comprising a program of instructions executable by the processor and configured to cause the processor to initialize one or more information handling resources of the information handling system. The basic input/output system may be further configured to, prior to boot of an operating system of the information handling system, initialize a virtual device controller emulating a hardware controller for controlling peripheral devices communicatively coupled to the processor, and cause the virtual device controller to interact with a driver executing on the operating system to control the peripheral devices.

In accordance with these and other embodiments of the present disclosure, a method may include, by a basic input/output system comprising a program of instructions executable by a processor and configured to cause the processor to initialize one or more information handling resources of an information handling system: (i) prior to boot of an operating system of the information handling system, initializing a virtual device controller emulating a hardware controller for controlling peripheral devices communicatively coupled to the processor; and (ii) causing the virtual device controller to interact with a driver executing on the operating system to control the peripheral devices.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: (i) prior to boot of an operating system of the information handling system, initialize a virtual device controller emulating a hardware controller for controlling peripheral devices communicatively coupled to the processor; and (ii) cause the virtual device controller to interact with a driver executing on the operating system to control the peripheral devices.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
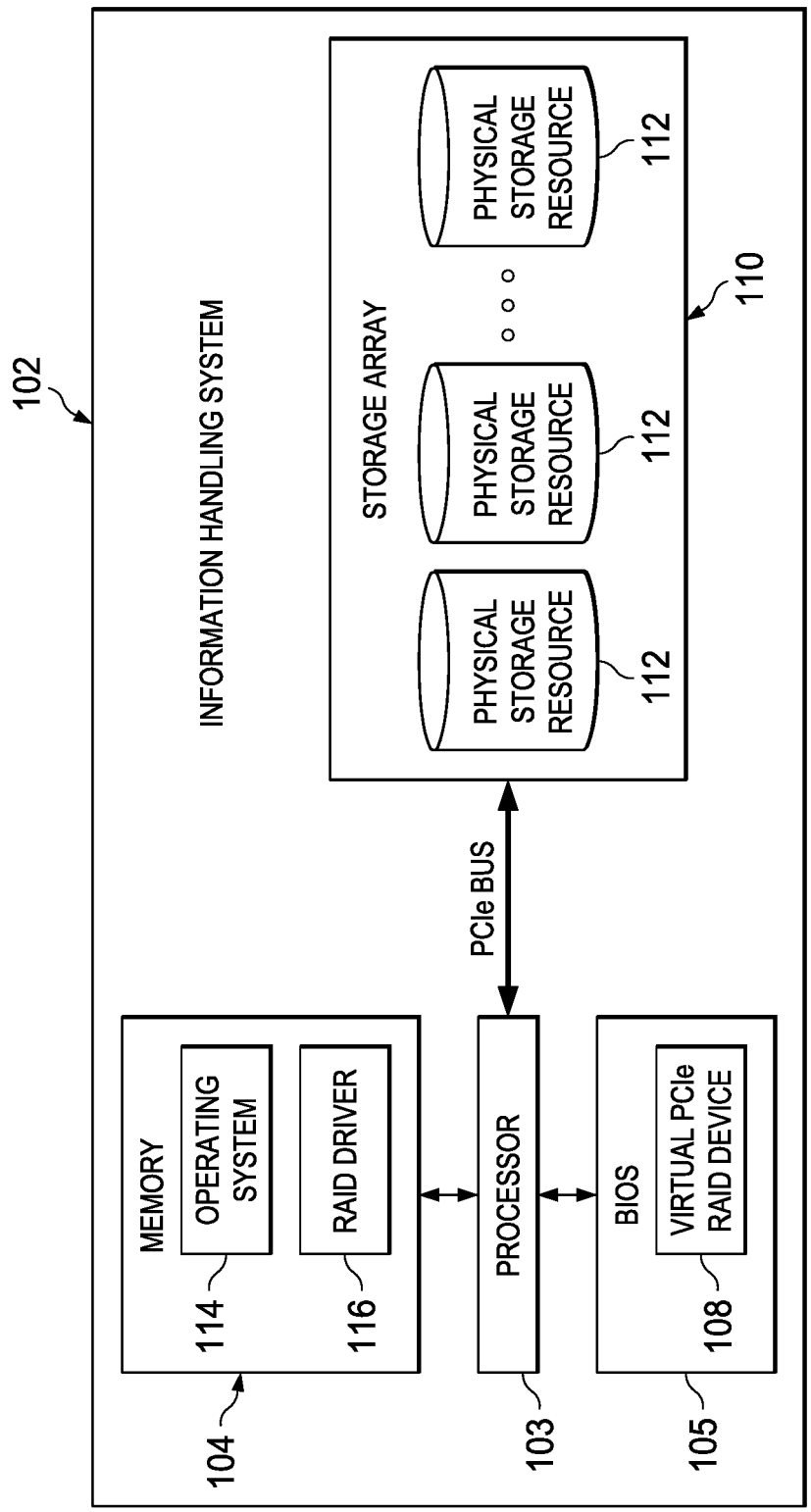
FIG. 1 illustrates a block diagram of an example information handling system, in accordance with embodiments of the present disclosure.
Figure 2:
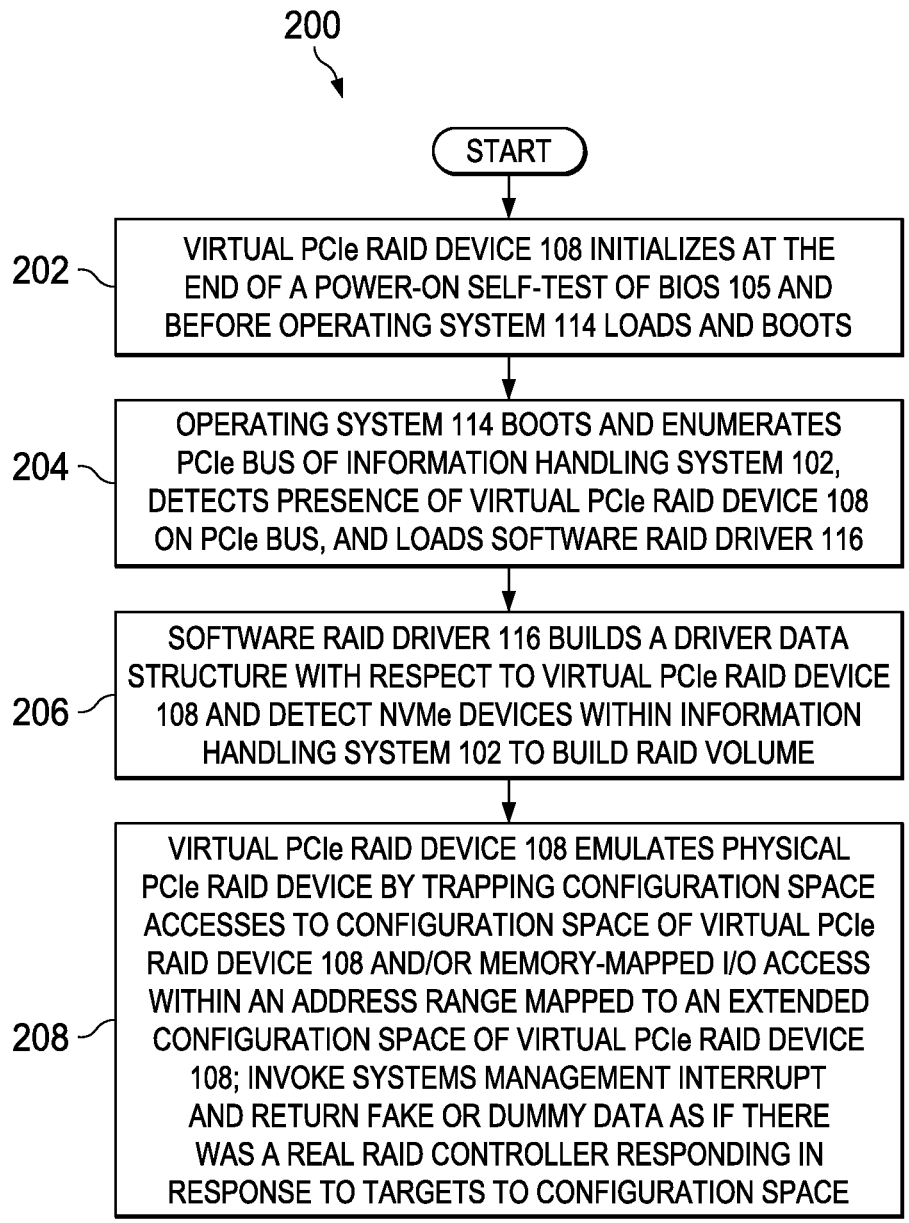
FIG. 2 illustrates a flow chart of an example method for BIOS emulation of a PCIe device, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an information handling system 102. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.).

As depicted in FIG. 1, information handling system 102 may include processor 103, a memory 104 communicatively coupled to processor 103, a basic input/output system (BIOS) 105, and a storage array 110.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may have stored thereon an operating system (OS) 114, and a software RAID driver 116.

OS 114 may comprise any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 (e.g., from storage array 110) for execution by processor 103.

Software RAID driver 116 may comprise any program of instructions configured to, when read and executed by processor 103, provide an interface between OS 114 and hardware or firmware executing on one or more physical storage resources 112 of storage array 110, in order to control and manage RAID of physical storage resources 112 of storage array 110 and manage I/O between processor 103 and storage array 110.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 105 may include virtual PCIe RAID device 108. Virtual PCIe RAID device 108 may comprise a program of instructions, a portion thereof that may be read by and executed on processor 103, and may be configured to, when executed, emulate a physical PCIe RAID device as is typically present within an NVMe or other device, in order to interact in concert with software RAID driver 116 in order to manage and control RAID on storage array 110.

Storage array 110 may include a plurality of physical storage resources 112. In some embodiments, storage array 110 may comprise a storage area network or "SAN." Although FIG. 1 depicts storage array 110 internal to information handling system 102, in some embodiments, storage array 110 may be external to information handling system 102 (e.g., coupled to information handling system 102 via a network or other wired connection).

Physical storage resources 112 may include one or more hard disk drives, magnetic tape libraries, optical disk drives, magneto-optical disk drives, compact disk drives, compact disk arrays, disk array controllers, and/or any other system, apparatus or device operable to store media. In operation, RAID driver 116 may configure one or more physical storage resources 112 to appear to an operating system or virtual machine executing on information handling system 102 as a single logical storage unit or virtual storage resource (which may also be referred to as a "LUN" or a "volume"). In particular embodiments, one or more physical storage resources 112 may comprise a PCIe device, such as an NVMe storage resource.

As shown in FIG. 1, a PCIe bus may couple processor 103 to storage array 110.

FIG. 2 illustrates a flow chart of an example method 200 for BIOS emulation of a PCIe device, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, at the end of a power-on self-test of BIOS 105 and before OS 114 loads and boots, BIOS 105 may initialize and execute virtual PCIe RAID device 108. Upon initialization, virtual PCIe RAID device 108 may emulate a physical PCI RAID device having a particular bus: device: function (BDF) or other appropriate identifier. In some embodiments, such BDF or other identifier may be chosen in a way such that it is always on a lower bus/device than any NVMe device to be controlled by virtual PCIe RAID device 108. Also, a device class or other identifier may be assigned to virtual PCIe RAID device 108 such that it appears to OS 114 as a hardware RAID controller (e.g., class 0x1, subclass 0x4, and Prog. I/F 0x0 for a RAID controller class code).

Accordingly, at step 204, upon booting up, OS 114 may enumerate the PCIe bus of information handling system 102 and may detect the presence of virtual PCIe RAID device 108 on the PCIe bus, and in response, load software RAID driver 116.

At step 206, software RAID driver 116 may build a driver data structure with respect to virtual PCIe RAID device 108 and may detect NVMe devices within information handling system 102 and build a RAID volume based on such detection.

At step 208, in operation, virtual PCIe RAID device 108 emulates a physical PCIe RAID device by trapping configuration space accesses to configuration space of virtual PCIe RAID device 108 and/or memory-mapped I/O access within an address range mapped to an extended configuration space of virtual PCIe RAID device 108. When a configuration space access is targeted to virtual PCIe RAID device 108, virtual PCIe RAID device 108 may invoke a systems management interrupt and return fake or dummy data as if there was a real RAID controller responding.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Accordingly, using the systems and methods herein, an individual NVMe device (e.g., storage resource 112) may be removed (e.g., from storage array 110) but software RAID driver 116 may remain active as virtual PCIe RAID device 108 remains present. Accordingly, a RAID volume comprising NVMe devices can be rebuilt after a redundancy loss and removal of an NVMe device.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a basic input/output system comprising a program of instructions executable by the processor and configured to cause the processor to initialize one or more information handling resources of the information handling system, and further configured to:
   prior to boot of an operating system of the information handling system, initialize a virtual device controller emulating a physical storage controller for controlling storage resources communicatively coupled to the processor;

cause the virtual device controller to interact with a driver executing on the operating system to control the storage resources; and prevent the operating system from, in response to physical removal of the physical storage controller from the information handling system, unloading the driver.

2. The information handling system of claim 1, wherein the storage resources comprise Non-Volatile Memory Express storage devices.

3. The information handling system of claim 1, wherein the storage resources comprise Peripheral Component Interconnect devices and the virtual device controller is configured to emulate a Peripheral Component Interconnect controller.

4. The information handling system of claim 1, wherein the driver comprises a software Redundant Array of Inexpensive Disks driver.

5. A method comprising, by a basic input/output system comprising a program of instructions executable by a processor and configured to cause the processor to initialize one or more information handling resources of an information handling system:

prior to boot of an operating system of the information handling system, initializing a virtual device controller emulating a physical storage controller for controlling storage resources communicatively coupled to the processor;

causing the virtual device controller to interact with a driver executing on the operating system to control the storage resources; and preventing the operating system from, in response to physical removal of the physical storage controller from the information handling system, unloading the driver.

6. The method of claim 5, wherein the storage resources comprise Non-Volatile Memory Express storage devices.

7. The method of claim 5, wherein the storage resources comprise Peripheral Component Interconnect devices and the virtual device controller emulates a Peripheral Component Interconnect controller.

8. The method of claim 5, wherein the driver comprises a software Redundant Array of Inexpensive Disks driver.

9. An article of manufacture comprising:

a non-transitory computer-readable medium; and computer-executable instructions carried on the computer-readable medium, the instructions readable by a processor, the instructions, when read and executed, for causing the processor to:

prior to boot of an operating system of an information handling system, initialize a virtual device controller emulating a physical storage controller for controlling storage resources communicatively coupled to the processor;

cause the virtual device controller to interact with a driver executing on the operating system to control the storage resources; and prevent the operating system from, in response to physical removal of the physical storage controller from the information handling system, unloading the driver.

10. The article of claim 9, wherein the storage resources comprise Non-Volatile Memory Express storage devices.

11. The article of claim 9, wherein the storage resources comprise Peripheral Component Interconnect devices and the virtual device controller is configured to emulate a Peripheral Component Interconnect controller.

12. The article of claim 9, wherein the driver comprises a software Redundant Array of Inexpensive Disks driver.

* * * * *